United States Patent
Zhu et al.

(10) Patent No.: US 9,799,367 B1
(45) Date of Patent: Oct. 24, 2017

(54) MULTIPLE DISK LOADER APPARATUS

(71) Applicant: Futurewei Technologies, Inc., Plano, TX (US)

(72) Inventors: Jiafeng Zhu, Pleasanton, CA (US);
Zijia Wang, Santa Clara, CA (US);
Xuan Song, Iowa City, IA (US);
Ron-Chung Hu, Palo Alto, CA (US);
Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/274,662

(22) Filed: Sep. 23, 2016

(51) Int. Cl.
| *G11B 17/04* | (2006.01) |
| *G11B 17/038* | (2006.01) |
| *B65G 47/90* | (2006.01) |
| *B65G 59/06* | (2006.01) |
| *B25J 15/00* | (2006.01) |

(52) U.S. Cl.
CPC ......... *G11B 17/038* (2013.01); *B25J 15/0028* (2013.01); *B25J 15/0047* (2013.01); *B25J 15/0052* (2013.01); *B65G 47/90* (2013.01); *B65G 59/061* (2013.01)

(58) Field of Classification Search
None
See application file for complete search history.

(56) References Cited

U.S. PATENT DOCUMENTS

| 3,288,471 | A | * | 11/1966 | Weedfall | G11B 17/16 369/209 |
| 4,559,623 | A | * | 12/1985 | Dennis | G11B 17/0281 369/207 |
| 4,701,896 | A | * | 10/1987 | Allebest | G11B 7/0037 720/615 |
| 5,692,878 | A | * | 12/1997 | Freund | B65G 59/026 414/796.6 |
| 6,111,847 | A | * | 8/2000 | Assadian | B25J 15/028 294/97 |
| 6,222,800 | B1 | * | 4/2001 | Miller | G11B 7/28 369/30.19 |
| 6,490,232 | B2 | * | 12/2002 | Sato | G11B 17/08 369/30.34 |
| 6,807,673 | B2 | * | 10/2004 | Takeshima | G11B 17/021 720/706 |

(Continued)

FOREIGN PATENT DOCUMENTS

JP 2004005871 A * 1/2004
JP EP 2034478 A2 * 3/2009 ............. B32J 15/10

*Primary Examiner* — Will J Klimowicz
(74) *Attorney, Agent, or Firm* — Schwegman Lundberg & Woessner, P.A.

(57) ABSTRACT

A multiple disk loader apparatus includes a plurality of rods. Each rod has a pair of pins extending radially from a side of the rod. The pair of pins are spaced circumferentially around the rod with respect to each other. Each pin has a top surface wherein the top surface of a first pin is longitudinally separated from the top surface of a second pin by a predetermined gap. A rotation device is coupled to the plurality of rods. The rotation device rotates the plurality of rods individually through a respective predetermined arc and in a respective rotational direction in order to extract a disk stack from storage and to separate a disk from the stack to load into a drive.

21 Claims, 13 Drawing Sheets

(56) References Cited

U.S. PATENT DOCUMENTS

| | | | | |
|---|---|---|---|---|
| 7,032,232 B2* | 4/2006 | Russ | ............... | G11B 17/022 |
| | | | | 369/30.34 |
| 7,885,148 B2* | 2/2011 | Ikeda | ............... | G11B 23/40 |
| | | | | 369/30.03 |
| 9,227,324 B1* | 1/2016 | Abdul Rashid | ... | H01L 21/67781 |
| 2003/0002400 A1* | 1/2003 | Klein | ............... | G11B 17/08 |
| | | | | 369/30.55 |

* cited by examiner

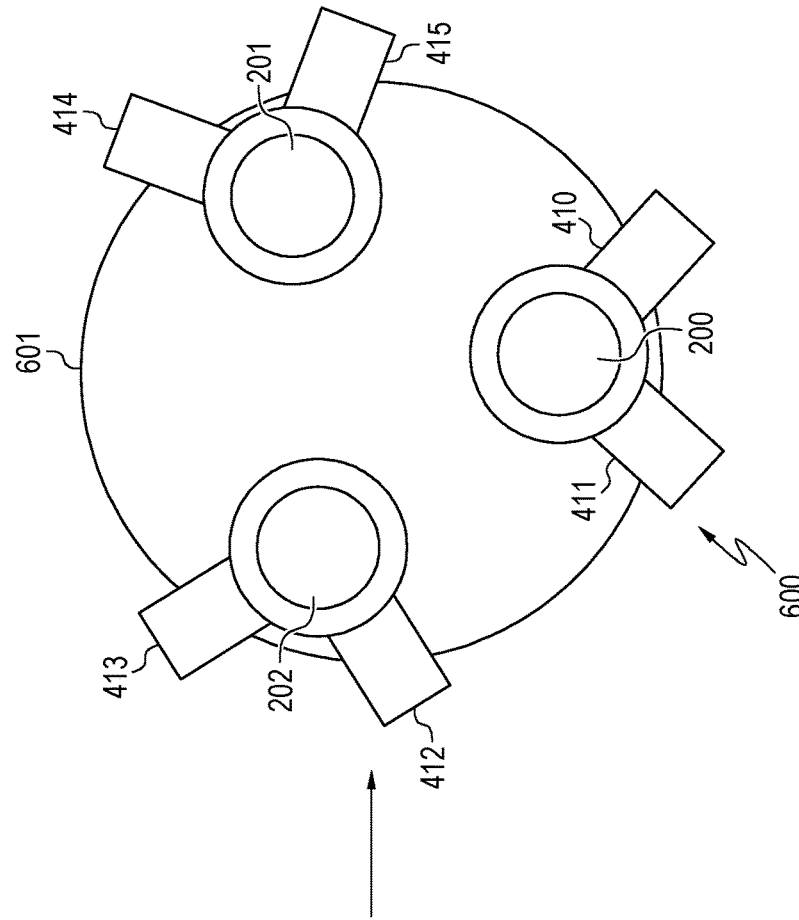
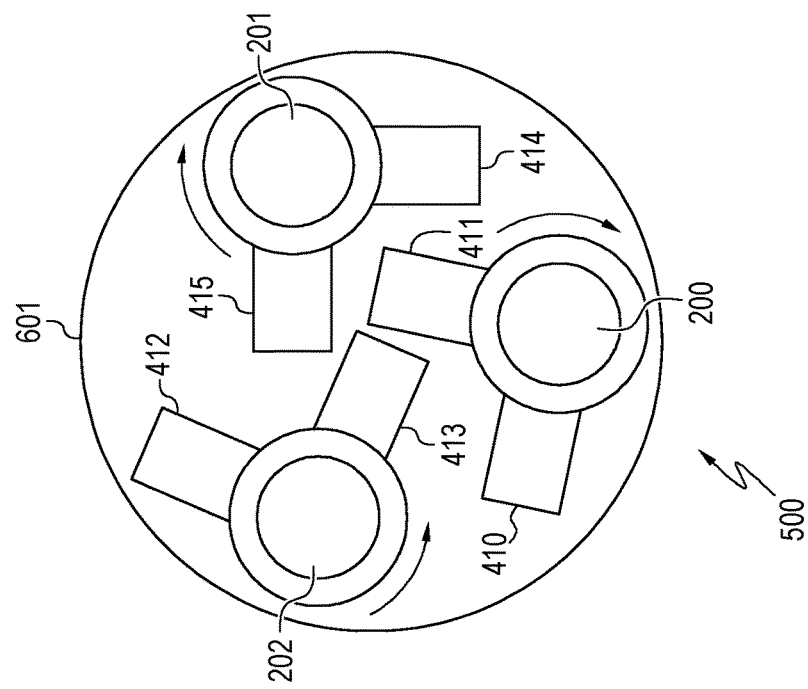
FIG. 6

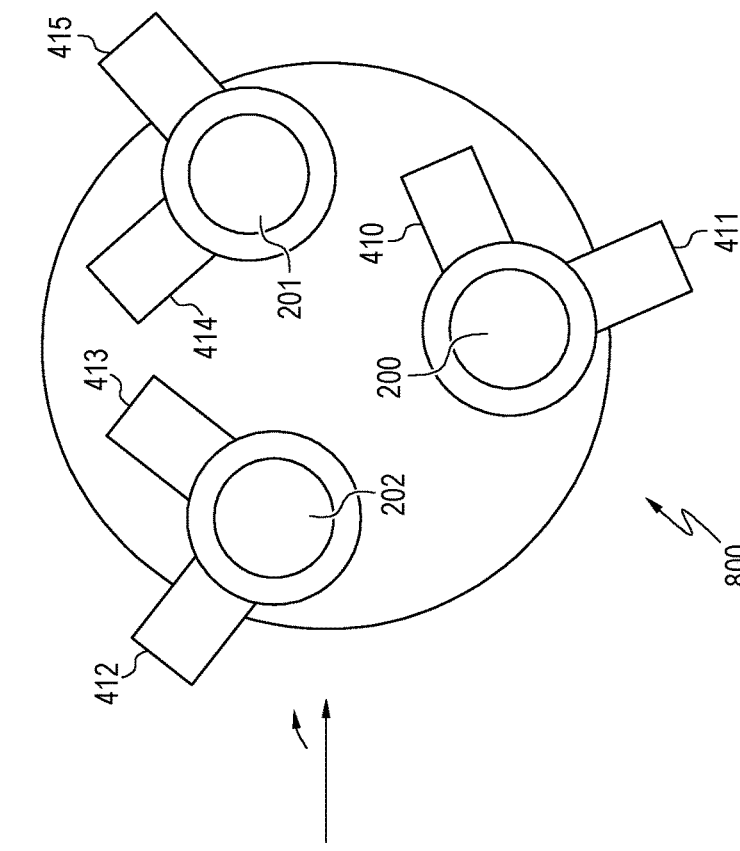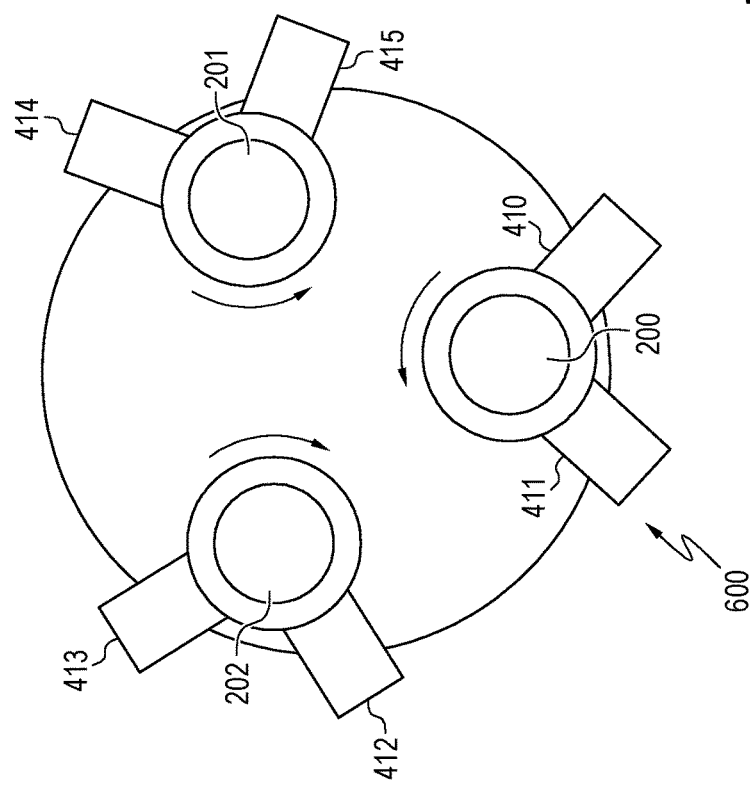
FIG. 8

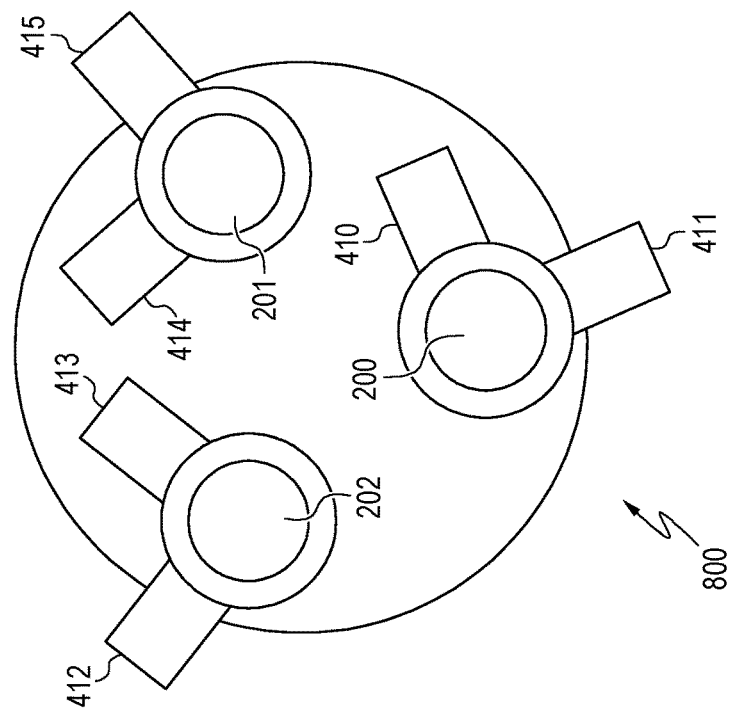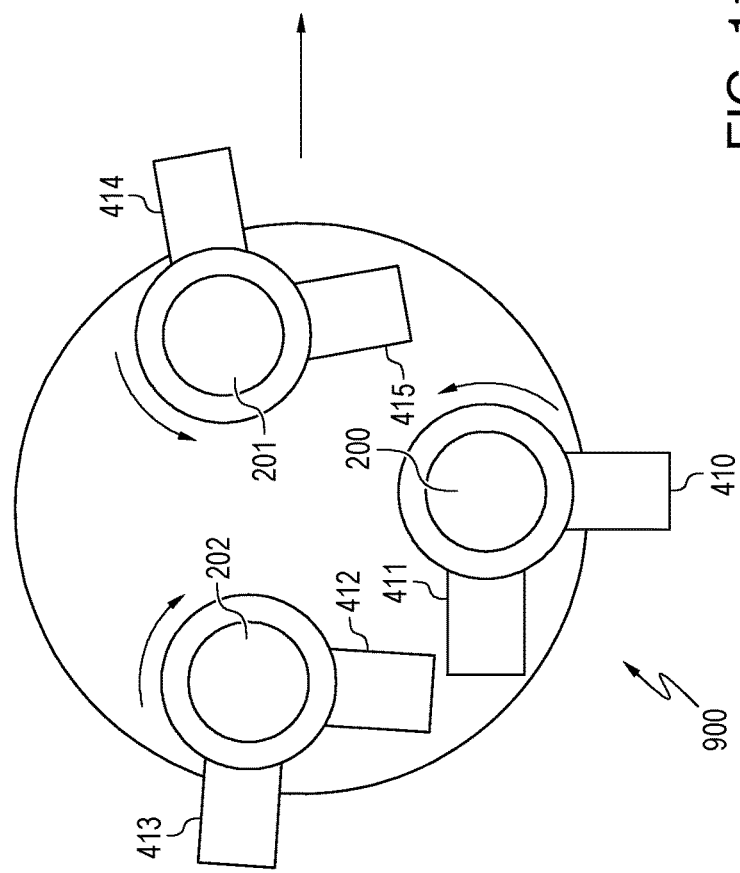
FIG. 11

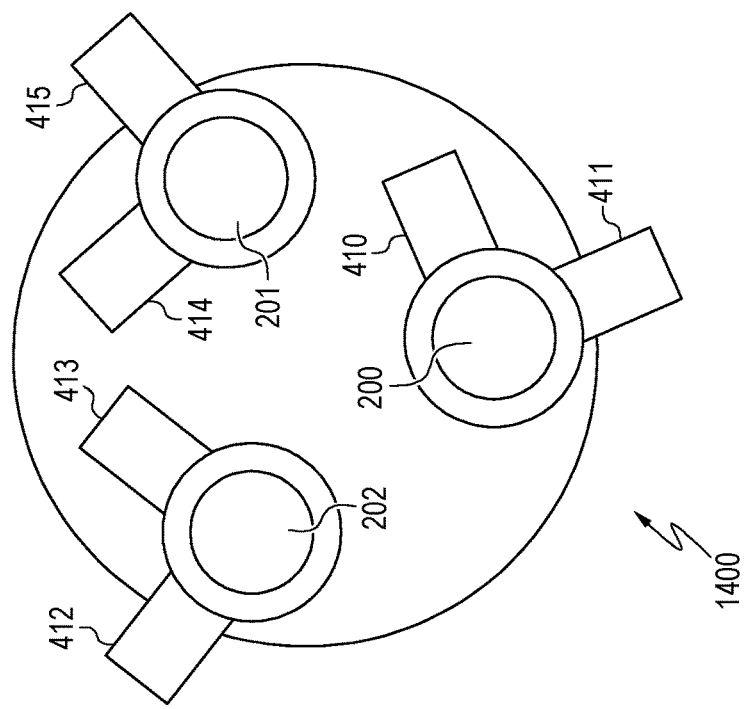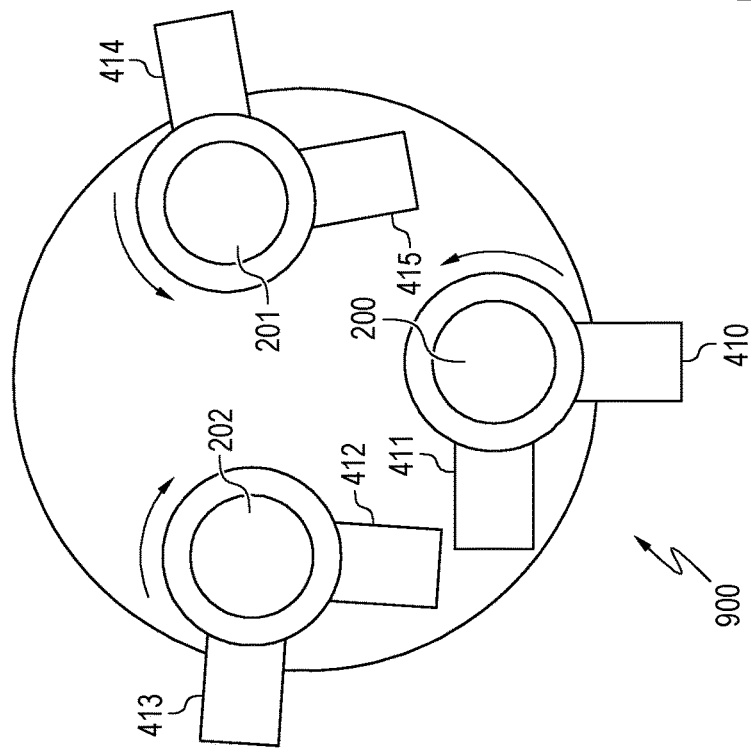
FIG. 14

MULTIPLE DISK LOADER APPARATUS

TECHNICAL FIELD

The present disclosure is related generally to disk loaders and in particular to a multiple disk loader apparatus to load disks from storage cartridges to disk drives.

BACKGROUND

Data archiving, also referred to as cold storage, is the process of moving data that is no longer actively used to specialized mass data storage devices for long-term retention. Archived data comprises older data that is still important to an organization and may be needed for future reference but is no longer actively accessed on a regular basis.

Cold storage of large amounts of data may be accomplished using various techniques such as large capacity magnetic disks, tapes, or optical disks. It is desirable to be able to access large numbers of disks from storage.

SUMMARY

A multiple disk loader apparatus embodiment includes a plurality of rods. Each rod has a pair of pins extending radially from a side of the rod. The pair of pins are spaced circumferentially around the rod with respect to each other. Each pin has a top surface wherein the top surface of a first pin is longitudinally separated from the top surface of a second pin by a predetermined gap. A rotation device is coupled to the plurality of rods. The rotation device rotates the plurality of rods individually through a respective predetermined arc and in a respective rotational direction in order to extract a disk stack from storage and to separate a disk from the stack to load into a drive.

A method embodiment for loading a disk into a disk drive includes rotating the plurality of rods into an insertion configuration. Each of the plurality of rods includes a higher pin and a lower pin. The insertion configuration comprises rotating the higher pin and the lower pin of each rod such that the plurality of rods are insertable into a central opening of a disk stack, comprising the disk, without the higher pin and the lower pin engaging the disk stack. The method then rotates the plurality of rods into an extraction configuration such that the higher pins engage a lower surface of the disk stack so that the disk stack can be extracted from a storage device. The disk is separated from the disk stack in response to rotating the plurality of rods through at least one disk separation configuration such that an outer edge of the higher pin of at least one of the rods is inserted between the disk and a next adjacent disk in the disk stack.

BRIEF DESCRIPTION OF THE DRAWINGS

FIG. 6 illustrates movement of the rods from the insertion configuration to an extraction configuration, in accordance with various embodiments.

FIG. 8 illustrates movement of the rods from the extraction configuration to a first disk separation configuration, in accordance with various embodiments.

FIG. 11 illustrates movement of the rods from the second disk separation configuration back to the first disk separation configuration, in accordance with various embodiments.

FIG. 14 illustrates movement of the rods from the second disk separation configuration back to the previous configuration in preparation for disk retrieval, in accordance with various embodiments.

DETAILED DESCRIPTION

Some of the challenges noted above, as well as others, can be addressed by a multiple disk loader apparatus and method of operation. The multiple disk loader apparatus has a plurality of rods with axially offset protrusions subsequently referred to as pins. The rods may be controllably inserted a selected distance into a center opening of a stack of disks and, by multiple controlled rotation of the rods to position the pins in predetermined orientations, a single disk may be separated from the stack of disks and provided to a disk drive device for reading and/or writing of the separated disk.

Disk cartridges or other disk storage devices may include a removable disk stack comprising a plurality of disks. Each disk may be encoded with data and/or video for long term storage. Subsequent descriptions of the disks to be loaded and unloaded from a cartridge refer to any type of disk having a central opening through which the multiple disk loader apparatus may be inserted. For example, such disks may include either video or data disks in formats such as digital versatile disk (DVD), Blu-ray, DVD-read only memory (DVD-ROM), DVD-random access memory (DVD-RAM), or any other type of disk to be loaded from a cartridge to a disk drive for reading from or writing to the separated disk.

As discussed subsequently in greater detail, each of the plurality of rods is individually rotated to position its respective pins in a predetermined orientation such that, as a group, the pins of the plurality of rods are able to lift the stack of disks out of the storage cartridge. The rods can then be individually rotated as described to change the pin orientation in order to separate the lower disk of the stack from the stack of disks.

Figure 1:
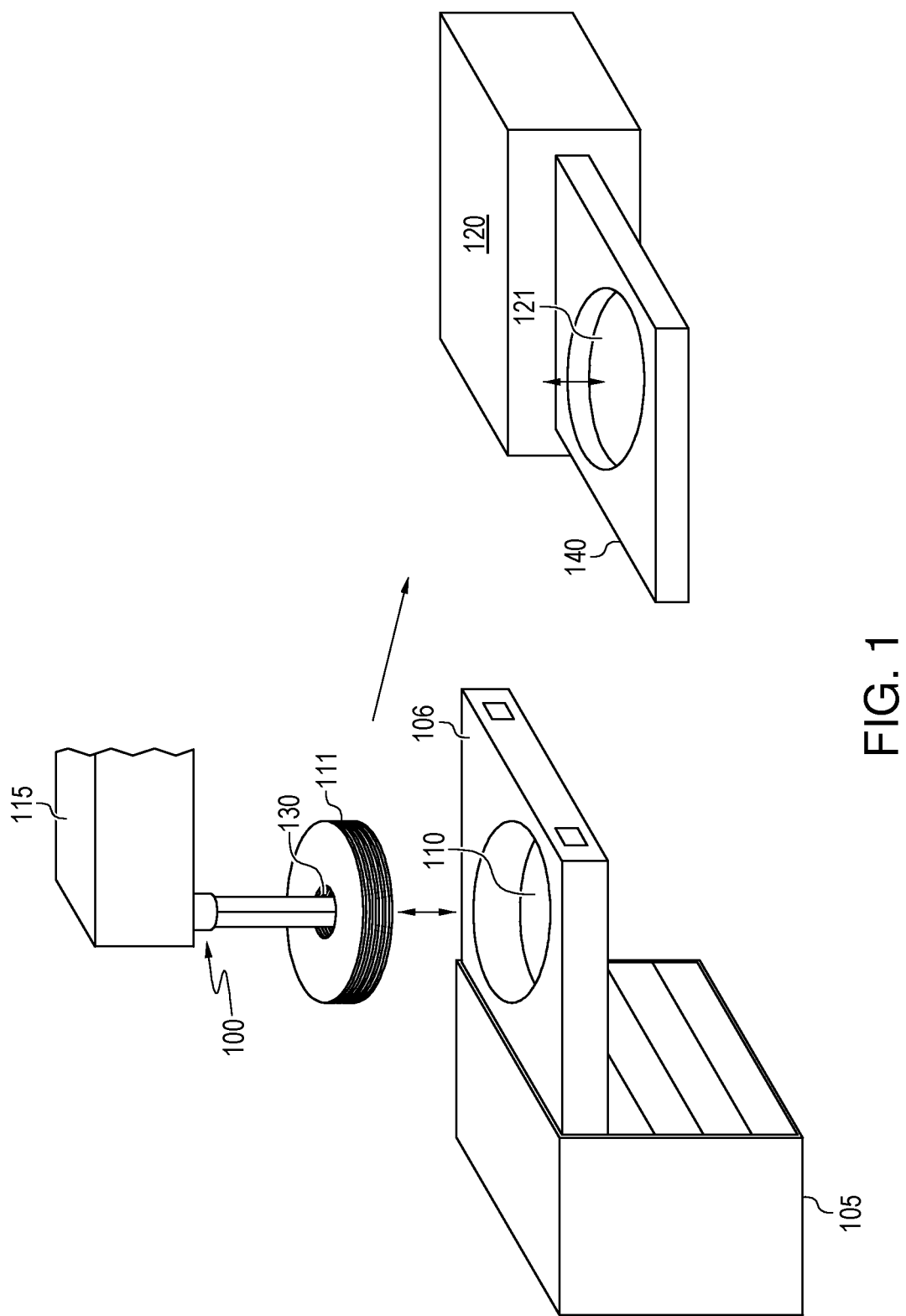
FIG. 1 illustrates a disk cartridge retrieval system with a multiple disk loader apparatus, in accordance with various embodiments.

FIG. 1 is a diagram of a disk cartridge retrieval system with the multiple disk loader apparatus 100, in accordance with various embodiments. This system is for purposes of illustration only to show the extraction of a disk stack 111 from a cartridge 106 and subsequent placement of the separated disk into a disk drive 120. Other systems may use the multiple disk loader apparatus 100 for substantially similar tasks.

The system comprises a stack of cartridges 105, each cartridge 106 comprising a slidable drawer that may be selectably removed or extended from the stack of cartridges 105. The top cartridge 106 of the stack of cartridges 105 is shown in an open position.

Each cartridge 106 comprises a circular opening 110 that is configured to retain the disk stack 111. The disk stack 111 is retained in the cartridge 106 by a floor in the opening 110 or a lip the surrounds a lower surface of the opening and engages an edge of a bottom disk of the stack. The disk stack 111 may then be removable or insertable through the top of the opening 110.

Each disk of the disk stack comprises a central opening 130 that aligns with the central opening 130 of the other disks in the stack in order to form a central opening through the entire stack. The multiple disk loader apparatus 100 is then insertable into this opening 130, as described subsequently in greater detail, for removal of the disk stack from the cartridge 106.

The multiple disk loader apparatus 100, comprising a plurality of rods (see FIG. 4), is coupled to a control head 115 for separate control of each of the rods of the apparatus 100. The control head 115 may include the rotation device (e.g., gears, motors), and control circuitry used to rotate and control individual rotation of the plurality of rods of the multiple disk loader apparatus 100.

For example, each of the plurality of rods may be coupled to a respective rotation device (e.g., stepper motor) 430, 431, 432 (see FIG. 4) for individual rotation of each rod by a selectable arc. In another embodiment, the rotation device may comprise a gearing system that is able to rotate each of the plurality of rods individually.

The multiple disk loader apparatus 100 is movable relative to the disk stack 111. The apparatus 100 may be inserted by the control head 115 lowering the apparatus 100 into the central opening 130. In another embodiment, the disk stack 111 may be moved upward such that the central opening 130 encircles the apparatus 100.

Figure 3:
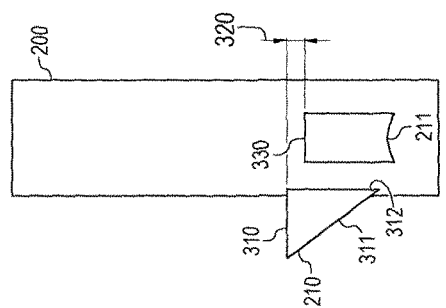
FIG. 3 illustrates a side view of the rod, in accordance with various embodiments.
Figure 2:
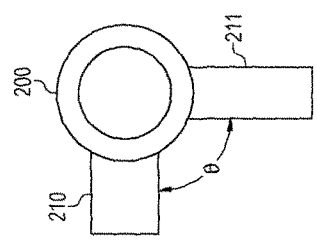
FIG. 2 illustrates a top view of a rod, in accordance with various embodiments.

In the illustrated embodiment, the multiple disk loader apparatus comprises the plurality of rods (e.g., three rods). Each of the plurality of rods is substantially identical to the other rods. FIGS. 2 and 3 are illustrative of each of these rods. The diameters of each of the plurality of rods is such that all of the rods together will still fit through the diameter of the central hole of a disk or stack of disks.

The system further comprises a disk drive 120 into which the separate disk from the stack of disks is to be lowered. The disk drive 120 comprises a tray 140 having a circular opening 121 that is configured to accept the separated disk. Once the separated disk is loaded into the tray 140, the tray closes and a spindle substantially in the center of the opening 121 may engage the opening in the separated disk in order to rotate the disk to the speed necessary to either write to or read from the disk. The drive 120 may then be coupled to another system (not shown) that reads the data from or writes data to the separated disk in the drive 120.

FIG. 2 illustrates a top view of a rod 200, in accordance with various embodiments. While the following description assumes each rod comprises a pair of pins 210, 211, other embodiments may use different numbers of pins.

Each rod 200 comprises the pair of pins 210, 211 extending radially from a side of the rod 200. The pair of pins 210, 211 are located and offset circumferentially around the rod 200 with respect to each other.

The pins 210, 211 are shown extending radially and at a 0 circumferential angle relative to each other. The pins 210, 211 are also shown having a substantially same length measured from the side of the rod 200. Both the angle shown as 90° and the length of the pins are for purposes of illustration only as other embodiments may use different angles for 0 as well as different pin lengths. If the angle is varied from the illustrated 90°, subsequently described angles of rotation may be adjusted to compensate for the difference.

FIG. 3 illustrates a side view of the rod 200, in accordance with various embodiments. The two pins 210, 211 are coupled to the rod 200 at a lower portion of the rod 200. The pins 210, 211 comprise a substantially triangular shape, when viewed orthogonally from the axis of the rod, with a top surface 310 being one side of the triangular shape that faces upward (relative to the disk stack) and is substantially perpendicular to the rod, a first side surface that slopes downward to the rod 200, and a second side surface that is relatively vertical with respect to the rod 200 and is coupled to the rod 200. Both pins 210, 211 are shown having a substantially same configuration. However, this is for purposes of illustration only as other embodiments may use pins having different configurations.

The pins may be substantially perpendicular with their respective rod even though they are not exactly 90° relative to that rod. For example, the pin may be angled away from perpendicular but still be able to engage the bottom of a disk.

The first pin 210 and second pin 211 are coupled to the rod 200 such that a top surface 330 of the second pin 211 is longitudinally lower than the top surface 310 of the first pin 210, relative to a bottom of the rod. This configuration may also be viewed as the top surface 310 of the first pin 210 being longitudinally higher, relative to a bottom of the rod 200, than the top surface 330 of the second pin 211. This gap 320 (i.e., longitudinal distance between the two top surfaces 310, 330) may be approximately the thickness of a disk to be separated from the disk stack.

Figure 4:
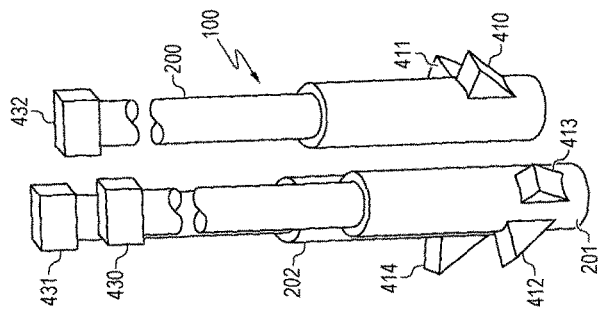
FIG. 4 illustrates a side view of the multiple disk loading apparatus, in accordance with various embodiments.

FIG. 4 illustrates a side view of the multiple disk loading apparatus 100, in accordance with various embodiments. The apparatus 100 is shown including a plurality of rods 200, 201, 202 (e.g., three). Other embodiments may use different numbers of rods 200-202. The rods 200-202 are grouped together as shown in order to fit into the center opening 130 of the disk stack.

Each of the rods 200-202 comprise the substantially identical configuration of the two pins 410, 411, 412, 413, and 414 as shown previously in FIGS. 2 and 3 at 210 and 211. The second pin 415 for the third rod 202 is not visible in the view of FIG. 4 but is shown later in subsequent figures.

Boxes 430-432 may represent either individual stepper motors coupled to each rod 200-202 or a system of gears that are configured to rotate each rod 200-202 as described subsequently. As subsequently described, pins 411, 413, 415 are considered lower pins while 410, 412, 414 are considered higher pins.

Figure 5:
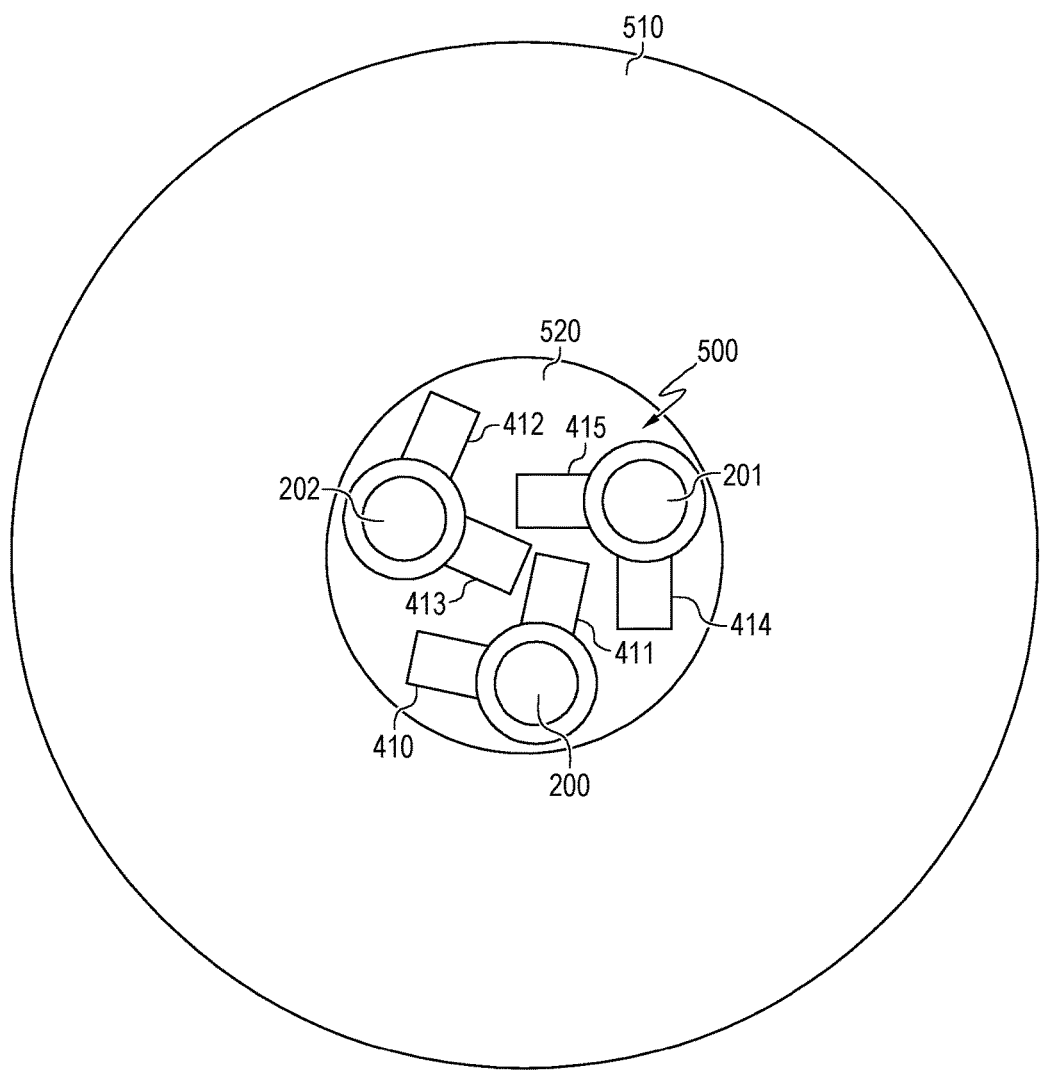
FIG. 5 illustrates a bottom view of a disk stack with the multiple disk loading apparatus in an insertion configuration in a central opening of the disk stack, in accordance with various embodiments.

FIG. 5 illustrates a bottom view of a disk stack 111 with the multiple disk loading apparatus 100 in an insertion configuration 500 in the central opening 520 of the disk stack, in accordance with various embodiments. While FIG.

5 shows the entire bottom disk 510 of the disk stack 111, for purposes of clarity only the central opening 520 (i.e., center hole) of the disk 510 with the loader apparatus 100 will be shown in subsequent figures. The remainder of the disk is assumed to surround the hole as shown in FIG. 5.

The embodiment of FIG. 5 shows the multiple disk loader apparatus 100 in the insertion configuration 500. In this configuration 500, the pins 410-415 of the apparatus 100 are rotated inward relative to the edges of the central opening 520 so that the apparatus 100 is free to be inserted into the opening 520 without any of the pins 410-415 engaging the edges of the central opening. The insertion configuration 500 may thus be used to allow insertion of the apparatus 100 into the disk stack while it is in the cartridge.

FIG. 6 illustrates movement of the rods 200-202 from the insertion configuration 500 to an extraction configuration 600, in accordance with various embodiments. The extraction configuration 600 may be used to remove the disk stack from the cartridge. Arrows of rotation for each individual rod 200-202 is shown next to the respective rod 200-202 to be rotated.

The rods 200-202 are rotated so that the higher pin 410, 412, 414 of each rod 200-202 engages at least an edge 601 of the lower surface of a bottom disk of the disk stack. This may be accomplished by rotating the rods 200-202 through an arc (e.g., approximately 180°). In the illustrated embodiment, two of the pins 200-201 are rotated counter-clockwise while the third pin 202 is rotated clockwise. In response to this rotation, the insertion configuration 500 on the left becomes the extraction configuration 600 on the right with the higher pin 410, 412, 414 of each rod 200-202 now engaging the lower surface of the disk stack (i.e., bottom surface of the lowest disk in the stack) to enable the disk stack to be raised.

Figure 7:
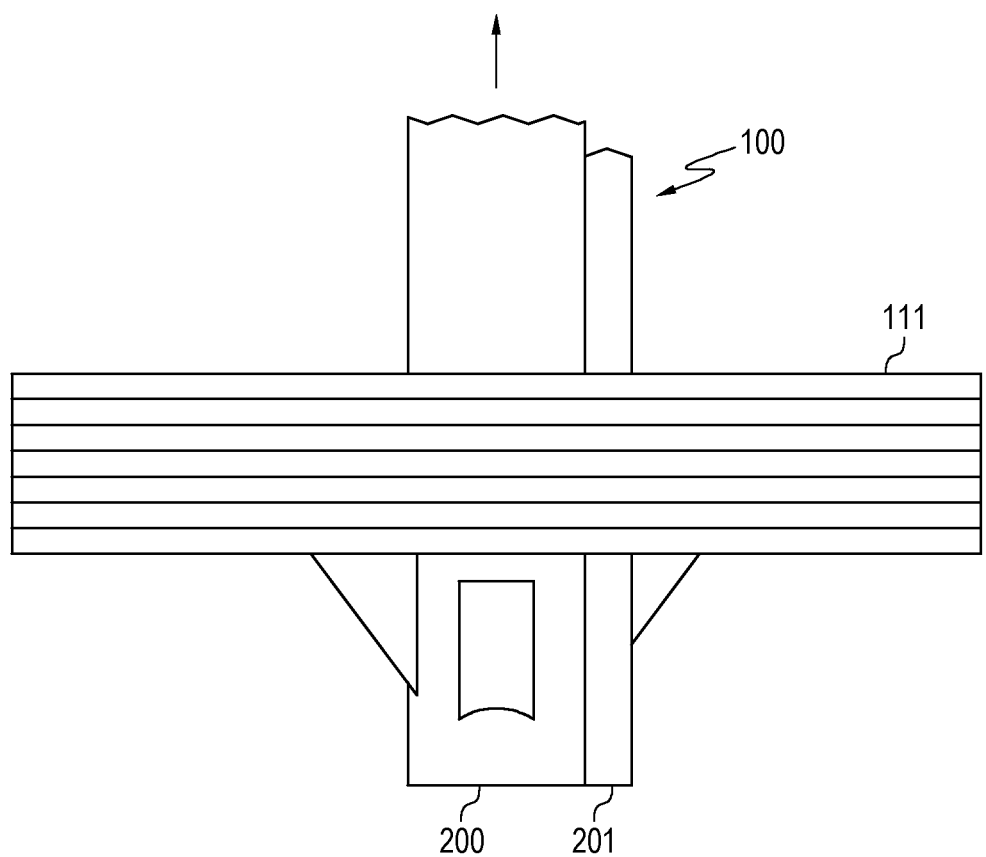
FIG. 7 illustrates a disk stack in an extraction position on the multiple disk loader apparatus, in accordance with various embodiments.

FIG. 7 illustrates the disk stack 111 in an extraction position on the multiple disk loader apparatus 100, in accordance with various embodiments. With the multiple disk loader apparatus 100 in the extraction configuration 600, the apparatus 100 may then extract the disk stack 111 from the cartridge either by raising the disk stack 111 out of the cartridge or the cartridge being lowered from around the disk stack 111.

FIG. 8 illustrates movement of the rods 200-202 from the extraction configuration 600 to a first disk separation configuration 800, in accordance with various embodiments. As discussed previously, the rotation arrows show individual rotation of each respective rod 200-202 in transitioning from one configuration 600 to another 800.

The rods 200-202 are each rotated through an arc (e.g., approximately) 60° so that the top surfaces of the lower pins 411, 415 of two of the rods 200, 201 now support the disk stack on a bottom side of the stack while the top surface of the higher pin 412 of the third rod 202 supports the other side of the stack. Thus, the disk stack in the first separation configuration 800 is now slightly off-level due to one side being supported by the higher pin 412 while the other side of the disk stack is pulled down by gravity to be supported by two lower pins 411, 415.

Figure 9:
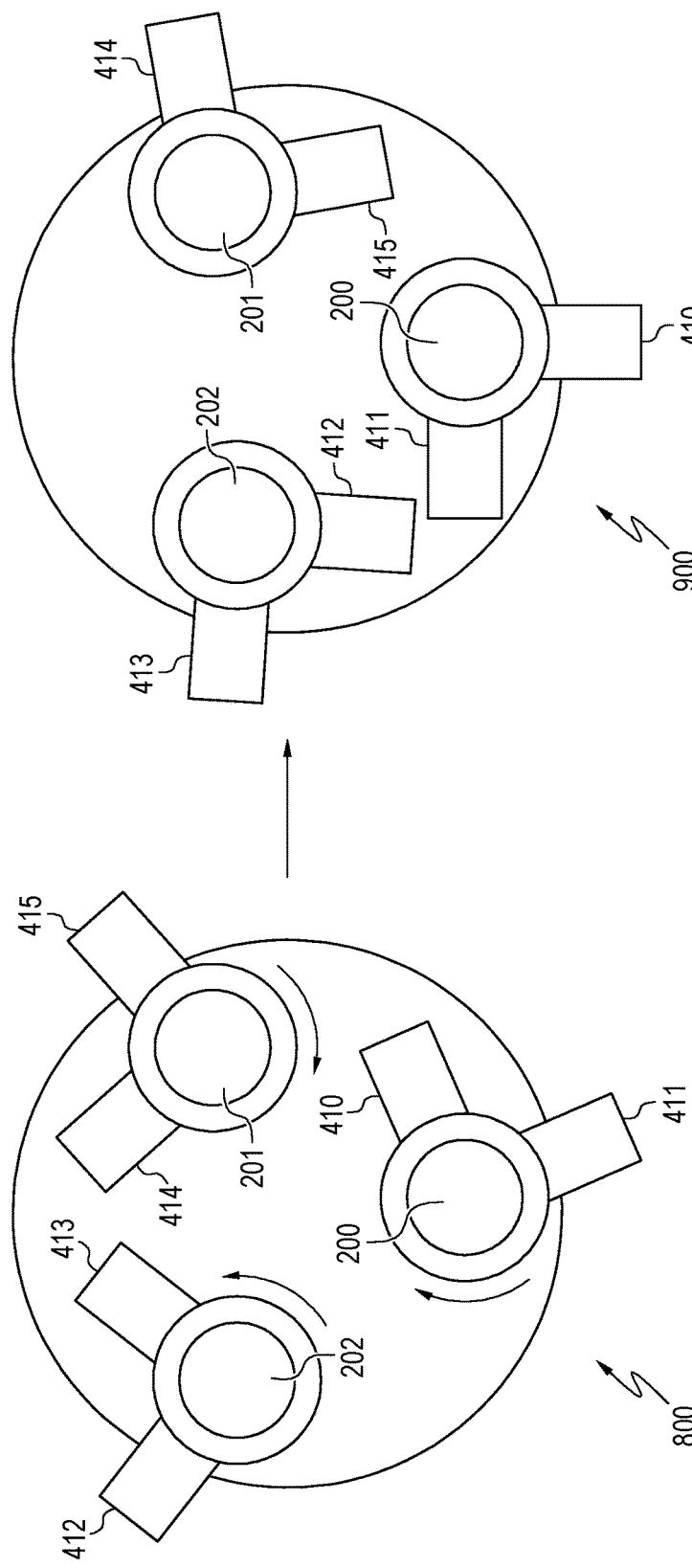
FIG. 9 illustrates movement of the rods from the first disk separation configuration to a second disk separation configuration, in accordance with the various embodiments.

FIG. 9 illustrates movement of the rods from the first disk separation 800 configuration to a second disk separation configuration 900, in accordance with the various embodiments.

In transitioning between the first and second disk separation configurations 800, 900, one of the pins 202 is rotated counter-clockwise through an arc (e.g., approximately 120°) while the other two pins 200, 201 are rotated clockwise through an arc (e.g., approximately 120°). Since there is approximately a disk thickness between the top surfaces of the higher and lower pins, this rotation causes the tips of the higher pins 410, 414 of the two pins rotating clockwise to be inserted between a top surface of a lower disk and a bottom surface of the adjacent disk above the lower disk. Gravity pulls the lower disk down to the top surface of the lower pins 411, 413, 415 of the rods rotating counter-clockwise. The lower disk is now supported by the lower pins 411, 413, 415.

Figure 10:
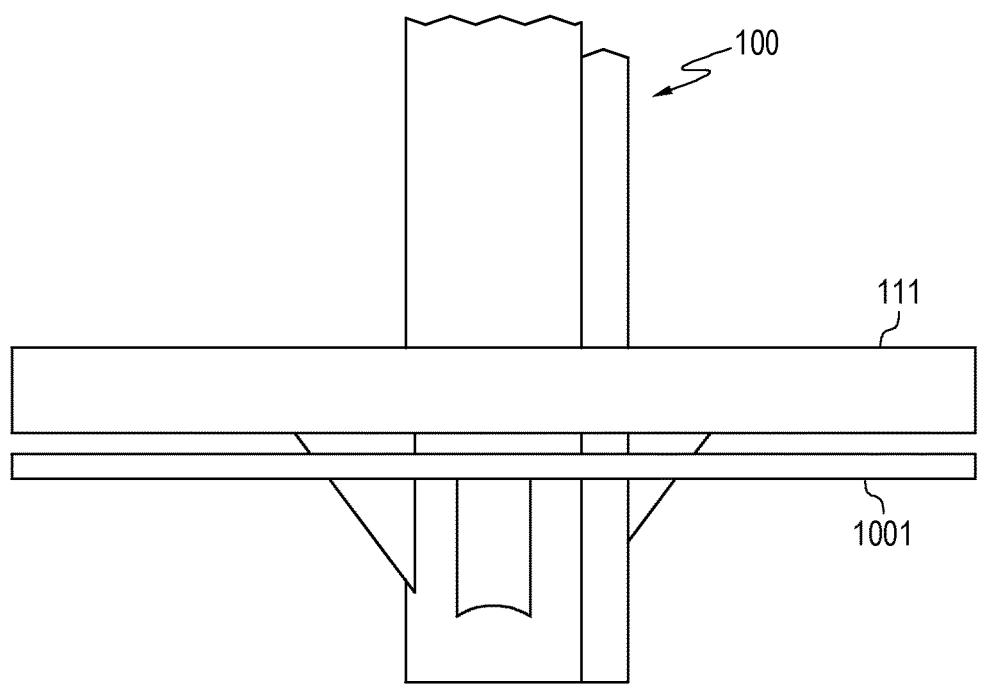
FIG. 10 illustrates separation of a lower disk from the disk stack after the first and second disk separation configurations, in accordance with various embodiments.

FIG. 10 illustrates separation of a lower disk 1001 from the disk stack 111 after the first and second disk separation configurations 800, 900, in accordance with various embodiments. The lower disk 1001 is still being supported by the lower pins 411, 413, 415 of the rods 201, 201, 202 while the higher pins 410, 412, 414 of the other rods 200, 201, 202 are inserted between the lower, separated disk 1001 and the rest of the stack 111. The separated lower disk 1001 may then be completely dropped from multiple disk loader apparatus 100 into a disk drive by going from the second disk separation configuration back to the first disk separation configuration and then returning to the second disk separation configuration as disclosed in FIGS. 11 and 12.

FIG. 11 illustrates movement of the rods 200-202 from the second disk separation configuration 900 back to the first disk separation configuration 800, in accordance with various embodiments. In doing so, the rods are rotated in the opposite direction from that shown in FIG. 9. In other words, two of the rods are rotated counter-clockwise through an arc (e.g., approximately 120°) while the third rod 202 is rotated clockwise through an arc (e.g., approximately 120°). This moves the higher pin 412 of the third rod 202 between the lower disk 1001 and the remainder of the disk stack 111. At this point, the lower disk 1001 is supported by the lower pins 411, 415 of two of the rods 200, 201.

Figure 12:
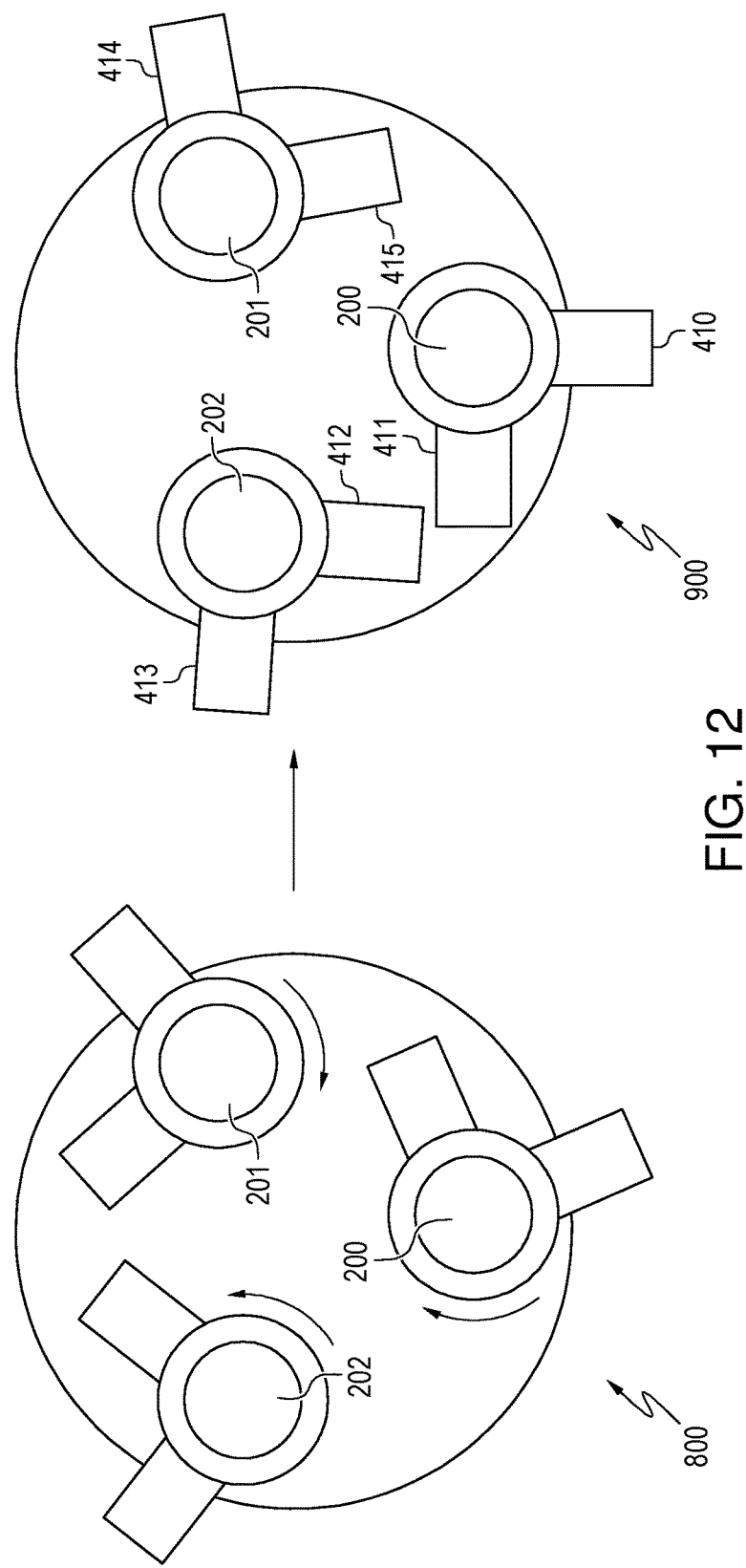
FIG. 12 illustrates movement of the rods from the first disk separation configuration back to the second disk separation configuration, in accordance with various embodiments.
Figure 13:
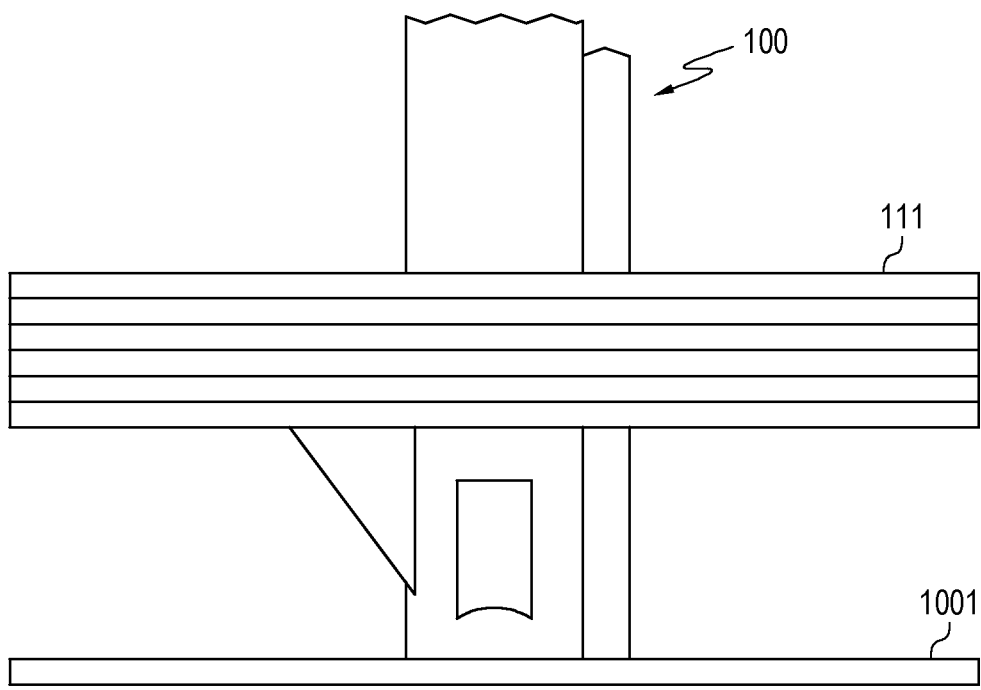
FIG. 13 illustrates the disk stack after the lower disk has been dropped from the multiple disk loader apparatus, in accordance with various embodiments.

FIG. 12 illustrates movement of the rods from the first disk separation configuration 800 back to the second disk separation configuration 900, in accordance with various embodiments. As the one rod rotates counter-clockwise through an arc (e.g., approximately 120°) and the remaining rods rotate clockwise through an arc (e.g., approximately 120°), the disk is allowed to fall off the lower pins 411, 413, 415 and, thus, fall off the apparatus 100 completely. This may be accomplished over a disk drive so that the disk 1001 falls into the drive. FIG. 13 illustrates the disk stack after the lower disk 1001 has been dropped from the multiple disk loader apparatus 100, in accordance with various embodiments.

If the lowest disk of the stack is not the desired disk, the above method may be repeated until the desired disk is reached. The intervening disks may be loaded into multiple drives, in the tray of the cartridge, or some other temporary holding mechanism.

FIG. 14 illustrates movement of the rods from the second disk separation configuration 900 back to the configuration 1400 in preparation for disk retrieval from the disk drive, in accordance with various embodiments. The previous configuration 1400 is now referred to as the initial disk retrieval configuration 1400.

A disk retrieval process begins from configuration 1400 in FIG. 14. From this configuration, the rods spin so that all pins are facing inward (e.g., insertion configuration 500). The rods are inserted into the central hole of the disk for retrieval and the rods spin such that the pins face out and upper surfaces of the lower pins engage a lower surface of the disk. The rods are raised to lift the disk out of the disk drive tray. This process is repeated (e.g., all pins turned inward then turned outward) for each disk being retrieved until all of the disks desired to be retrieved are back on the rods and replaced into their cartridge.

Figure 15:
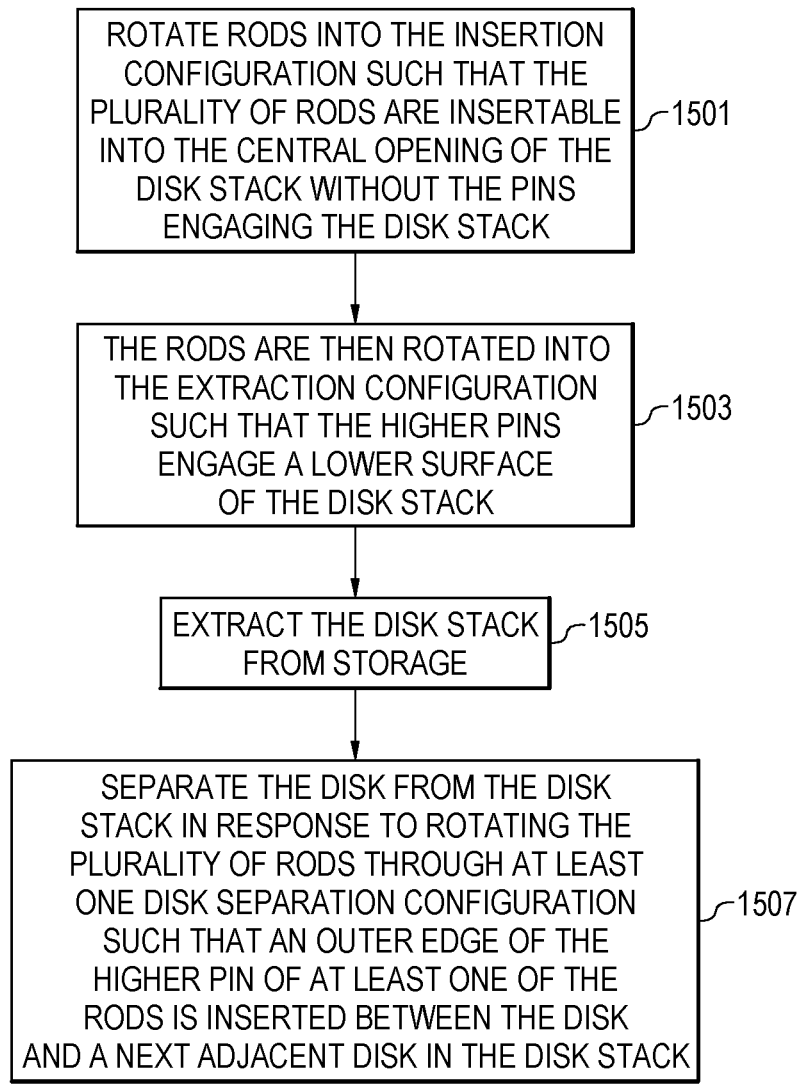
FIG. 15 illustrates a flowchart of a method for disk loading with the multiple disk loader apparatus, in accordance with various embodiments.

FIG. 15 illustrates a flowchart of a method for disk loading with the multiple disk loader apparatus, in accordance with various embodiments. In block 1501, the rods are rotated into the insertion configuration. Each of the rods includes the higher pin and the lower pin. Rotating the rods into the insertion configuration comprises rotating the higher pin and the lower pin of each rod such that the plurality of rods are insertable into the central opening of the disk stack without the higher pin or the lower pin engaging the disk stack.

In block 1503, the rods are rotated into the extraction configuration such that the higher pins engage a lower surface of the disk stack. This may be accomplished by rotating the higher pin and lower pin of each rod such that a top surface of the higher pin engages a bottom of the disk stack. In block 1505, the disk stack is extracted from the storage device (e.g., disk cartridge).

In block 1507, the disk is separated from the disk stack in response to rotating the plurality of rods through at least one disk separation configuration such that an outer edge of the higher pin of at least one of the rods is inserted between the disk and a next adjacent disk in the disk stack. The at least one disk separation configurations comprise the first and second disk separation configurations.

The first separation configuration includes rotating the plurality of rods from the extraction configuration by rotating a first rod of the plurality of rods through a first arc in a clockwise direction and rotating second and third rods of the plurality of rods through the first arc in a counter-clockwise direction. The second separation configuration includes rotating the plurality of rods from the first separation configuration by rotating the first rod through a second arc in the counter-clockwise direction and rotating the second and third rods through the second arc in the clockwise direction.

The disk is dropped from the apparatus to the disk drive by transitioning from the extraction configuration to the first separation configuration to insert the outer edge of the higher pin between the disk and the next adjacent disk then transitioning from the first separation configuration to the second separation configuration to separate the disk from the disk stack. A transition from the second separation configuration to the first separation configuration is then performed followed by a transition from the first separation configuration to the second separation configuration to load the disk into the disk drive.

The locations of each respective disk may be tracked by a software routine. Thus, when a particular disk is dropped into a disk drive, a mapping of that disk with that particular drive is tracked so that, when the disks are retrieved to be returned to the cartridge for storage, the order of disk retrieval may be adjusted depending on a desired order of the stack of disks.

Disclosed implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a computer. For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

The previous description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The Abstract is provided with the understanding that it will not be used to limit or interpret the scope or meaning of the claims. The following claims are hereby incorporated into the detailed description, with each claim standing on its own as a separate embodiment.

What is claimed is:

1. A multiple disk loader apparatus comprising:
 a plurality of rods, each rod comprising a first pin and a second pin extending radially from a side of the rod, the first and second pins spaced circumferentially around the rod with respect to each other, each pin having a top surface wherein the top surface of the first pin is longitudinally separated from the top surface of the second pin, the plurality of rods grouped together such that the plurality of rods fit through a hole in a disk when the plurality of rods are in an insertion configuration; and
 a rotation device coupled to the plurality of rods, the rotation device configured to rotate the plurality of rods individually through a respective predetermined arc and in a respective rotational direction.

2. The apparatus of claim 1, wherein each pin is perpendicular to the rod.

3. The apparatus of claim 2, wherein each pin comprises a triangular shape wherein the top surface is one side of the triangular shape.

4. The apparatus of claim 3, wherein the first pin is spaced 90 degrees circumferentially around a respective rod from the second pin.

5. The apparatus of claim 1, wherein the rotation device is a plurality of stepper motors or a system of gears.

6. The apparatus of claim 1, wherein the rotation device is configured to rotate the plurality of rods into an insertion configuration such that the plurality of rods fit through a central opening of a disk stack.

7. The apparatus of claim 6, wherein the insertion configuration comprises the top surface of each of the pins rotated away from engaging a surface of the disk stack.

8. The apparatus of claim 6, wherein the top surface of the first pin is higher than the top surface of the second pin relative to a bottom of the rod and wherein the rotation device is further configured to rotate the rods into an extraction configuration such that the top surface of the higher pin of each rod engages a lower surface of a bottom disk of the disk stack.

9. The apparatus of claim 8, wherein the rotation device is further configured to rotate the rods into a first disk separation configuration such that a bottom disk of the disk stack is separated from the disk stack by an edge of at least one of the first or second pins.

10. The apparatus of claim 9, wherein the rotation device is further configured to rotate the rods into a second disk separation configuration such that the bottom disk is loaded into a disk drive in response to repetition between the first and second disk separation configurations.

11. A disk cartridge retrieval system, the system comprising:
  a multiple disk loader apparatus for extracting a disk stack from a disk cartridge, the apparatus comprising:
    a plurality of rods, each rod comprising a higher pin and a lower pin extending radially from a side of the rod, the higher and lower pins spaced circumferentially around the rod with respect to each other, each pin having a top surface extending substantially perpendicular from the rod wherein the top surface of the higher pin is longitudinally separated from the top surface of the lower pin with respect to a bottom of the rod; and
    a rotation device coupled to the plurality of rods, the rotation device configured to rotate the plurality of rods individually through a respective predetermined arc and in a respective rotational direction based on an insertion, extraction, or separation configuration; and
  a disk drive configured to accept a separated disk from the multiple disk loader apparatus.

12. The system of claim 11, wherein the top surface of the higher pin is longitudinally separated from the top surface of the lower pin by a gap substantially equal to a thickness of a disk.

13. The system of claim 11, wherein the disk stack comprises a plurality of disks having a format of at least one of digital versatile disk (DVD), Blu-ray, DVD-read only memory (DVD-ROM), or DVD-random access memory (DVD-RAM).

14. The system of claim 11, wherein the plurality of rods comprise three rods grouped together such that the group of rods is insertable into a central opening of the disk stack when the plurality of rods are in the insertion configuration.

15. A method for loading a disk into a disk drive, the method comprising:
  rotating a plurality of rods into an insertion configuration, each of the plurality of rods comprising a higher pin and a lower pin, wherein rotating the plurality of rods into the insertion configuration comprises rotating the higher pin and the lower pin of each rod such that the plurality of rods are insertable into a central opening of a disk stack comprising the disk without the higher pin or the lower pin engaging the disk stack;
  rotating the plurality of rods into an extraction configuration such that the higher pins engage a bottom surface of the disk stack;
  extracting the disk stack from a storage device; and
  separating the disk from the disk stack in response to rotating the plurality of rods through at least one disk separation configuration such that an outer edge of the higher pin of at least one of the rods is inserted between the disk and a next adjacent disk in the disk stack.

16. The method of claim 15, wherein rotating the plurality of rods into the extraction configuration comprises rotating the higher pin and lower pin of each rod such that a top surface of the higher pin engages the bottom surface of the disk stack.

17. The method of claim 16, wherein the at least one disk separation configuration comprises a first separation configuration and a second separation configuration.

18. The method of claim 17, wherein the first separation configuration comprises rotating the plurality of rods from the extraction configuration by:
  rotating a first rod of the plurality of rods through a first arc in a clockwise direction; and
  rotating second and third rods of the plurality of rods through the first arc in a counter-clockwise direction.

19. The method of claim 18, wherein the second separation configuration comprises rotating the plurality of rods from the first separation configuration by:
  rotating the first rod through a second arc in the counter-clockwise direction; and
  rotating the second and third rods through the second arc in the clockwise direction.

20. The method of claim 18, wherein the higher pin and the lower pin are separated circumferentially around their respective rod by approximately 90°, the first arc comprises approximately 60° and the second arc comprises approximately 120°.

21. The method of claim 20, further comprising:
  transitioning from the extraction configuration to the first separation configuration to insert the outer edge of the higher pin between the disk and the next adjacent disk;
  transitioning from the first separation configuration to the second separation configuration to separate the disk from the disk stack;
  transitioning from the second separation configuration to the first separation configuration; and
  transitioning from the first separation configuration to the second separation configuration to load the disk into the disk drive.

* * * * *